June 23, 1953    F. J. AVES    2,642,830
CURB SIGNAL
Filed Sept. 25, 1950

INVENTOR
FRED J. AVES
BY
ATTORNEYS

Patented June 23, 1953

2,642,830

UNITED STATES PATENT OFFICE 2,642,830

CURB SIGNAL

Fred J. Aves, Los Angeles, Calif.

Application September 25, 1950, Serial No. 186,612

1 Claim. (Cl. 116—28)

This invention relates to signalling devices and, in its more particular aspects, relates to a device to be mounted on an automobile fender to create a resonant vibratory signal when the vehicle approaches too close to a curbstone or other obstruction.

While devices for signalling too close approach of a vehicle to a curb are well known in the art, and are in rather extensive use, all such devices with which I am familiar have the shortcoming that they are not adjustable to accommodate different vehicles and different conditions of use.

It is, therefore, an object of my present invention to provide a fully adjustable curb signalling device for mounting upon an automobile fender.

It is also an object of the invention to provide a curb-signalling device which is capable of creating a highly resonant signal upon engagement with an obstruction.

Other objects will appear hereinafter.

Without intending thereby to limit the broader scope of the invention as defined by the accompanying claim, I shall now describe a presently preferred embodiment thereof, for which purpose I shall refer to the accompanying drawings, wherein, Fig. 1 is a side elevation of the device attached to an automobile fender.

Figure 1:
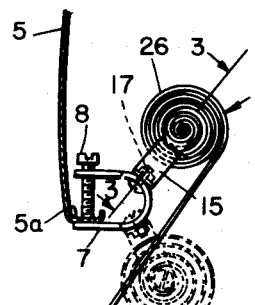
Figure 2:
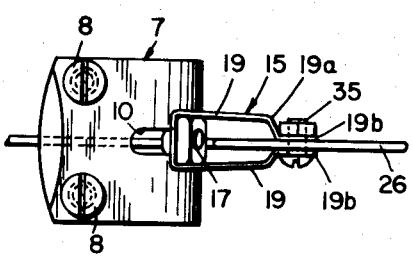
Fig. 2 is a top plan view.
Figure 3:
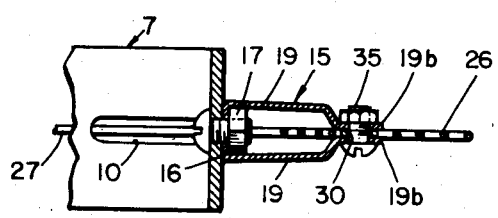
Fig. 3 is an enlarged section taken on line 3—3 of Fig. 1.
Figure 4:
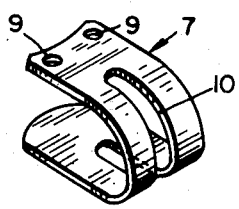
Fig. 4 is a perspective view of the bracket by which the device is attached to a fender, and, Fig. 5 is a perspective view of the retainer by which the feeler element is attached to the bracket.
Figure 5:
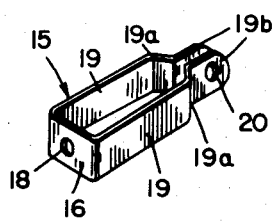

Referring now to the drawings, the numeral 5 denotes, in section, an automobile fender having the usual inturned marginal flange 5a.

A U-shaped bracket 7 is clamped to the flange 5a by means of a pair of screws 8 which threadedly extend through holes 9 in the bracket. The bracket has in its front or closed end wall an arcuate slot 10 for the purpose to be described.

A somewhat U-shaped retainer element 15 has its closed end wall 16 adjustably attached to the bracket 7 by means of a nut and bolt 17, the bolt extending through a hole 18 in the retainer. The outer ends of the side walls 19 of the retainer are bent at 19a to converge towards each other and terminate in parallel end portions 19b, having registering holes 20.

The signalling element, generally designated 25, comprises a length of resonant metal such as spring wire bent to form an open coil 26 terminating in an elongated feeler or antenna 27 having a somewhat spherical outer end portion 28. The convolutions of the coil 26 are so arranged that neither touches the other, so that vibration generated by the end 28 of the feeler engaging a curb C will not be damped, in accordance with the teachings of my United States Letters Patent No. 2,464,365. The innermost convolution 30 is pivotally secured between the retainer portions 19b by means of a nut and bolt 35.

In use it is my preference to attach one of my signalling devices to each of the right-side fenders of the automobile. The full-line position of Fig. 1 denotes the usually preferred angle of disposition of the feeler 27. However, in the event it should be desired to have the device create a signal when the automobile fender is spaced further away from the curb, it is only necessary to loosen the bolt 17 and swing the retainer 15 about the arc of the front of the bracket until the feeler is disposed at the angle shown by the broken-line position of Fig. 1. The distance at which the signal would be created may be additionally adjusted by loosening the bolt 35 and rotating the coil about said bolt and again tightening the bolt.

It will be observed also that in the full-line position of Fig. 1 the signalling device is completely obscured from view from the right side of the vehicle, excepting only that the projecting outer end portion of the feeler 27 may be visible.

I claim:

A device for signalling too close approach of a vehicle to a curb comprising a U-shaped bracket having means for clamping it to a fender of the vehicle, the closed end wall of the bracket having a longitudinal arched slot therein, a U-shaped retainer, means securing the closed end wall of the retainer against the closed end wall of the bracket for adjustment longitudinally of said slot, and a feeler comprised of a length of spring wire having its inner end formed into an open Archimedean coil adjustably secured at its axis between the side walls of the retainer and having an elongated outer end portion disposed to project laterally from said vehicle for engagement with said curb.

FRED J. AVES.

References Cited in the file of this patent

UNITED STATES PATENTS

| Number | Name | Date |
|---|---|---|
| 1,679,715 | Fish | Aug. 7, 1928 |
| 1,992,165 | Bardon | Feb. 26, 1935 |
| 2,141,844 | Reznor | Dec. 27, 1938 |
| 2,464,365 | Aves | Mar. 15, 1949 |